UNITED STATES PATENT OFFICE.

ROBERT GANS, OF PANKOW, NEAR BERLIN, GERMANY, ASSIGNOR TO J. D. RIEDEL AKTIENGESELLSCHAFT, OF BERLIN, GERMANY.

PROCESS FOR THE PRODUCTION OF HYDRATED ALUMINOSILICATES OR ARTIFICIAL ZEOLITES.

1,131,503.

Specification of Letters Patent.

Patented Mar. 9, 1915.

No Drawing. Application filed August 4, 1911. Serial No. 642,383.

*To all whom it may concern:*

Be it known that I, Dr. ROBERT GANS, a subject of the German Emperor, residing at Pankow, near Berlin, Germany, manufacturing chemist, have invented a certain new and useful Process for the Production of Hydrated Aluminosilicates or Artificial Zeolites, of which the following is a specification.

This invention relates to a process for the production of hydrated alumino-silicates or artificial zeolites more especially for use in the softening of water, but is of general application to all purposes for which zeolites can be applied.

The object of the invention is to produce zeolites for industrial use of a hard granular structure and to enable hot water to be used in the process of their production.

According to Patent No. 943535 artificial zeolites are obtained by fusing silicates of alumina with alkali silicate or with alkali or alkali carbonate with the addition of quartz or minerals rich in quartz and leaching the melt with water. The composition of these melts corresponds, according to example No. 1 of the Patent No. 943535, to 3 parts by weight of kaolin, 6 parts by weight of quartz, 12 parts by weight of sodium carbonate, and according to example No. 2 of the Patent No. 943535, to 2 parts by weight of alumina, 12 parts by weight of quartz, 20 parts by weight of sodium carbonate, *i. e.*, approximately the molecular composition:—

$$1Al_2O_3 + 10SiO_2 + 10Na_2O.$$

These melts have various disadvantages:

1. The melts on cooling frequently form crystalline non-hydrated silicates, *i. e.*, which cannot be converted into zeolites.

2. They can conveniently be treated with cold water, but can only be treated with hot water when special precautions are taken. The temperature must not exceed beyond from 50 to 70° C., as otherwise products are formed which easily become slimy.

3. The size of the grains of the zeolites is often small and the grain is of foliated structure; on being used for technical purposes it breaks up into the finest particles, which unfavorably affects the filtering efficiency of the filters.

4. The hydration of the melts, *i. e.* the  conversion into zeolitic bodies, is only completed after a considerable time, therefore the apparatus must have a fairly large amount of space.

5. The large quantity of the superfluous soda makes the process expensive.

6. By the alkalinity of the melt the melting tanks become severely corroded.

These disadvantages can be obviated according to the invention, by which zeolites are produced by fusion at a high temperature of a charge comprising minerals or silicates of alumina, such as potash-feldspar, leucite, nephelin, phenolite, and the like, which contain combined silica and alkali, and which charge has a molecular composition approximately corresponding to the formula:—4 molecules $SiO_2$, 1 molecule $Al_2O_3$, 4 to 6 molecules soda ($Na_2O$).

As indicated by the examples given above a part of the soda in the melt may be replaced by potash contained in the mineral or in the form of potassium carbonate.

The melts thus obtained have the following technical advantages:

1. Much less tendency on cooling to turn into crystalline silicates.

2. They can be hydrated and converted into zeolitic bodies with hot water at from 90 to 100° C. in 2 to 3 hours.

3. The latter are of a hard, granular structure, do not fall to pieces in the filter and possess a larger size of grain than those formerly obtained.

4. The necessary apparatus for hydration requires less space.

5. The lower consumption of alkali carbonate cheapens the cost of production.

6. The life of the melting tanks is prolonged.

In carrying the invention into effect the charge is fused and the molten product is withdrawn from the furnace in which fusion is effected, and then cooled and crushed. It is then leached or hydrated with hot water. The zeolites that remain behind on leaching or hydration do not assume a plastic condition, but have a hard granular structure. These characteristics of the ultimate product are an indication that the process of fusion has been properly carried out.

The intermediate product obtained according to the present process must not be treated with cold water, as otherwise soft and small zeolites are produced. This product must be leached or hydrated for conversion into zeolites by treatment with hot water (advantageously at from 90–100° C.) for from 2 to 3 hours, whereby a product is produced quite distinct from those previously obtained. A further advantage is that by the employment of hot water the sodium silicate which passes into solution is of considerable concentration. It can therefore more readily be recovered.

Examples among the many possible compositions approximately corresponding to the molecular proportion hereinbefore specified are the following:

No. 1. 2.0 parts by weight of kaolin, 4.5 parts by weight of potash feldspar, 8.2 parts by weight of sodium carbonate. These proportions correspond to the molecular composition:—4 molecules $SiO_2$, 1 molecule $Al_2O_3$, 5.5 molecules $Na_2O$.

The melt must be leached or extracted with hot water by which zeolitic silicates are obtained as hard, large, grains which approximately possess the molecular composition:—2 to 3 molecules $SiO_2$, 1 molecule $Al_2O_3$, 1 molecule $(KNa)_2O$, 6 molecules $H_2O$.

No. 2. 2.0 parts by weight of kaolin, 3.5 parts by weight of leucite, 1.0 part by weight of quartz, 8.2 parts by weight of sodium carbonate, (or instead of sodium carbonate only 7.6 parts by weight of sodium carbonate and 0.8 part by weight of potash). This melt has the same molecular composition as the melt No. 1 and yields also the same zeolites.

It will be understood that naturally still smaller quantities of soda may be used in the melt, with about the same reduction in the quantity of silica, or that also slightly larger quantities of soda and silica or minerals rich in silica still permit of the treatment of the melt obtained with hot water at from 90 to 100° C.

What I claim as my invention and desire to secure by Letters Patent is:—

1. A process for the production of hydrated alumino-silicates or artificial zeolites comprising the fusion at a high temperature of a charge initially containing silicates of alumina having combined silica and alkali 2. A process for the production of hydrated alumino-silicates or artificial zeolites comprising the fusion at a high temperature of a charge initially containing in addition to alumina mineral having combined silica and alkali.

3. A process for the production of hydrated alumino-silicates or artificial zeolites comprising the fusion at a high temperature of a charge initially containing silicates of alumina combined silica and alkali, which charge has a relatively low content of alkali and silica.

4. A process for the production of hydrated alumino-silicates or artificial zeolites comprising the fusion at a high temperature of a charge initially containing silicates of alumina having combined silica and alkali, and in leaching the resulting melt with hot water.

5. A process for the production of hydrated alumino-silicates or artificial zeolites comprising the fusion at a high temperature of a charge initially containing in addition to alumina mineral having combined silica and alkali, and the hydration of the resulting melt with hot water.

6. A process for the production of hydrated alumino-silicates or artificial zeolites comprising the fusion at a high temperature of a charge initially containing silicates of alumina having combined silica and alkali, which charge has a relatively low content of alkali and silica and in leaching the resulting melt with hot water.

7. A process for the production of hydrated alumino-silicates or artificial zeolites comprising the fusion at a high temperature of a charge initially containing silicates of alumina containing combined silica and alkali, and in which charge the alkali content is made up in part of potash.

8. A process for the production of hydrated alumino-silicates or artificial zeolites comprising the fusion of a charge initially containing silicates of alumina having combined silica and alkali, in which charge the alkali content is made up in part of potash, and leaching the resulting melt with hot water.

9. A process for the production of hydrated alumino-silicates or artificial zeolites comprising the fusion of a charge initially containing in addition to alumina minerals having combined silica and potash.

10. A process for the production of hydrated alumino-silicates or artificial zeolites comprising the fusion of a charge initially containing in addition to alumina minerals having combined silica and potash, crushing the resulting melt and leaching with hot water.

11. A new article of manufacture consisting of hydrated alumino-silicates or artificial zeolites in a crystalline form in the conditions of hard grains insoluble in hot water.

In testimony whereof I have hereunto signed my name to this specification in the presence of two subscribing witnesses.

Dr. ROBERT GANS.

Witnesses:
Dr. Cornelius Massan,
Georg Tuttga.